United States Patent
Oya et al.

(10) Patent No.: US 10,302,503 B2
(45) Date of Patent: May 28, 2019

(54) TEMPERATURE SENSOR

(71) Applicant: NGK SPARK PLUG CO., LTD., Nagoya-shi, Aichi (JP)

(72) Inventors: Toshiya Oya, Nagoya (JP); Seiji Oya, Aichi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 160 days.

(21) Appl. No.: 15/432,419

(22) Filed: Feb. 14, 2017

(65) Prior Publication Data
US 2017/0241844 A1 Aug. 24, 2017

(30) Foreign Application Priority Data

Feb. 19, 2016 (JP) .................................. 2016-029419

(51) Int. Cl.
*G01K 7/00* (2006.01)
*C22C 5/04* (2006.01)
*G01K 7/18* (2006.01)
*G01K 7/22* (2006.01)
*G01K 7/16* (2006.01)

(52) U.S. Cl.
CPC .................. *G01K 7/00* (2013.01); *C22C 5/04* (2013.01); *G01K 7/18* (2013.01); *G01K 7/22* (2013.01); *G01K 2007/163* (2013.01)

(58) Field of Classification Search
CPC .. G01K 7/00; G01K 7/18; G01K 7/22; G01K 2007/163; C22C 5/04
See application file for complete search history.

(56) References Cited

U.S. PATENT DOCUMENTS

| | | | | |
|---|---|---|---|---|
| 3,049,577 A | * | 8/1962 | Hill | B32B 15/01 136/200 |
| 4,110,124 A | * | 8/1978 | Robertson | H01L 35/20 136/236.1 |
| 6,533,911 B1 | * | 3/2003 | Fujita | G01N 27/4075 204/424 |
| 9,754,706 B2 | * | 9/2017 | Fujita | H01C 7/006 |

(Continued)

FOREIGN PATENT DOCUMENTS

| JP | 11-40403 A | 2/1999 |
|---|---|---|
| JP | 2003-261350 A | 9/2003 |

(Continued)

*Primary Examiner* — Jonathan M Dunlap
*Assistant Examiner* — Philip L Cotey
(74) *Attorney, Agent, or Firm* — Sughrue Mion, PLLC

(57) ABSTRACT

A temperature sensor (1) including: a temperature sensing element (3) including a temperature sensing portion (4) having an electrical characteristic which varies depending on temperature, and an electrode wire (5) for outputting an electrical signal from the temperature sensing portion (4); and a sheath core wire (signal wire) (15) electrically connected to the electrode wire (5). The electrode wire (5) is formed from a platinum-palladium-rhodium alloy containing Pt, Pd and Rh. The alloy contains a total of 0.1 to 1.2 mol % of at least one alkaline-earth metal selected from the group consisting of Ca, Sr and Ba; 0.1 to 43.0 mol % of Pd; and 1.0 to 43.0 mol % of Rh, and the balance is Pt and incidental impurities. In the platinum-palladium-rhodium alloy, second-phase precipitated grains mainly containing Pt, Pd and the alkaline-earth metal are dispersed in a matrix phase.

4 Claims, 5 Drawing Sheets

(56) References Cited

U.S. PATENT DOCUMENTS

| | | | | |
|---|---|---|---|---|
| 9,766,134 B2* | 9/2017 | Oya | ........................ | G01K 1/12 |
| 9,842,675 B2* | 12/2017 | Fujita | ..................... | H01C 7/006 |
| 9,863,035 B2* | 1/2018 | Fujita | ...................... | G01K 7/22 |
| 10,054,497 B2* | 8/2018 | Fujita | .................... | C04B 35/581 |
| 2002/0088965 A1* | 7/2002 | Ogata | ..................... | G01K 7/22 |
| | | | | 252/500 |
| 2003/0177793 A1* | 9/2003 | Kock | ..................... | C03B 37/08 |
| | | | | 65/384 |
| 2005/0109062 A1* | 5/2005 | Stelle | ..................... | C03B 5/021 |
| | | | | 65/32.1 |
| 2007/0024414 A1* | 2/2007 | Beckmeyer | .............. | G01K 1/10 |
| | | | | 338/25 |
| 2007/0294881 A1* | 12/2007 | Nelson | .................... | G01K 7/18 |
| | | | | 29/612 |
| 2009/0297389 A1* | 12/2009 | Hasegawa | ................ | C22C 5/04 |
| | | | | 420/466 |
| 2009/0323765 A1* | 12/2009 | Yokoi | ..................... | G01K 1/08 |
| | | | | 374/185 |
| 2010/0214054 A1* | 8/2010 | Kobayashi | ............... | G01K 7/22 |
| | | | | 338/22 R |
| 2011/0280279 A1* | 11/2011 | Gregory | ................ | F01D 17/085 |
| | | | | 374/152 |
| 2012/0049996 A1* | 3/2012 | Kobayashi | ............... | G01K 7/22 |
| | | | | 338/22 R |
| 2012/0073356 A1* | 3/2012 | Nishijima | ........... | G01N 27/4075 |
| | | | | 73/23.32 |
| 2014/0367621 A1* | 12/2014 | Ko | ........................... | G01K 7/22 |
| | | | | 252/519.15 |
| 2016/0312338 A1* | 10/2016 | Miller | ..................... | C22C 5/04 |

FOREIGN PATENT DOCUMENTS

| | | |
|---|---|---|
| JP | 2005-119959 A | 5/2005 |
| JP | 2010-60404 A | 3/2010 |

\* cited by examiner

TEMPERATURE SENSOR

BACKGROUND OF THE INVENTION

1. Field of the Invention

The present invention relates to a temperature sensor for detecting the temperature of fluids, such as gas and the like.

2. Description of the Related Art

A temperature sensor has conventionally been known which includes: a temperature sensing element including a temperature sensing portion having an electrical characteristic which varies depending on temperature, and an electrode wire electrically connected to the temperature sensing portion; and a signal wire joined to the electrode wire. In the temperature sensor having the above structure, platinum-rhodium (PtRh) alloy is used as a material for the electrode wire of the temperature sensing element.

Platinum-rhodium alloy has been known as a material excellent in workability, weldability, heat resistance and corrosion resistance. Compared to pure platinum, which has similar advantages, platinum-rhodium alloy has higher strength in the range from room temperature to high temperatures. Also, unlike platinum-iridium (PtIr) alloy, platinum-rhodium alloy does not erode due to oxidation and volatilization of iridium. Therefore, platinum-rhodium alloy has been used as a heat-resistant alloy, a material for chemical equipment, a conductive material, a material for electric discharge electrodes, a material for contacts and the like in a wide variety of fields.

For example, Patent Document 1 discloses the use of a platinum alloy including platinum and rhodium as a constituent material for a glass fiber production nozzle and bushing. Patent Document 2 indicates that platinum-rhodium alloy is suitable for a glass ceramic material production apparatus. As described in these documents, platinum-rhodium alloy has been used as a high-temperature material which is highly resistant to oxidation.

Also, Patent Document 3 discloses a binary platinum-rhodium alloy wire incorporated in a temperature sensor element which is heat resistant to 1000° C., and indicates that the content of Rh is desirably 10 to 20 mass %. Patent Document 4 indicates that a platinum alloy containing 5 to 15 mass % of Ir and/or Rh is suitable as a material for an electrode wire of a temperature sensor which is used at high temperature. As described in these documents, platinum-rhodium alloy is also favorably used as a conductive material which is required to have heat resistance and high-temperature strength.

[Patent Document 1] Japanese Patent Application Laid-Open (kokai) No. 2003-261350

[Patent Document 2] Japanese Patent Application Laid-Open (kokai) No. 2005-119959

[Patent Document 3] Japanese Patent Application Laid-Open (kokai) No. H11-40403

[Patent Document 4] Japanese Patent Application Laid-Open (kokai) No. 2010-60404

3. Problems to be Solved by the Invention

A heat-resistant material is required to have a high melting point, high strength, high corrosion resistance and the like, and desirably maintains its stability during long-term use. If a conventional platinum-rhodium alloy is used at high temperature over a long period of time, grain growth unavoidably occurs to produce large and coarse crystal grains, which may result in breakage of grain boundaries. For example, binary platinum-rhodium alloy (an alloy made of platinum and rhodium is also hereinafter referred to as a "PtRh alloy") recrystallizes at 600° C. or higher and may form large and coarse crystal grains with a grain size exceeding 100 μm when the alloy is held at a high temperature of 1000° C. or higher for only several hours.

PtRh alloy, having such a feature, is more likely over time to break down due to, for example, slipping of grain boundaries even though it has high initial performance, and therefore, its stability during long-term use is insufficiently reliable. In addition, Pt and Rh production (particularly, Rh production) is small, Pt and Rh producing countries are unevenly located, and the demand for Pt and Rh is mostly from industries. Therefore, the prices of Rt and Rh are high and vary largely, which poses a problem of procurement. Under these circumstances, in the case where PtRh alloy is used as a material for the electrode wire of a temperature sensor having the above structure, the strength of the electrode wire is reduced due to long-term use at high temperature, which may result in a problem such as breakage of the electrode wire. Another problem is that the price of the temperature sensor easily is greatly increased.

SUMMARY OF THE INVENTION

It is therefore an object of the present invention to provide a temperature sensor employing an alloy as an electrode wire which does not form large and coarse crystal grains even when the sensor is used at high temperature over a long period of time, and which electrode wire has enhanced high-temperature strength.

The above object has been achieved by providing (1) a temperature sensor comprising: a temperature sensing element including a temperature sensing portion having an electrical characteristic which varies depending on temperature, and an electrode wire for outputting an electrical signal from the temperature sensing portion; and a signal wire electrically connected to the electrode wire. The electrode wire is formed from a platinum-palladium-rhodium alloy containing Pt, Pd and Rh. The platinum-palladium-rhodium alloy contains a total of 0.1 to 1.2 mol % of at least one alkaline-earth metal selected from the group consisting of Ca, Sr and Ba, 0.1 to 43.0 mol % of Pd, and 1.0 to 43.0 mol % of Rh, the remainder being Pt and incidental impurities. In the platinum-palladium-rhodium alloy, second-phase precipitated grains mainly containing the Pt, the Pd and the alkaline-earth metal are dispersed in a matrix phase. The incidental impurities refer to unintended contaminants derived from raw materials or from a working process including a melting crucible or the like.

According to the above temperature sensor (1), since the second-phase precipitated grains are present in the electrode wire, the movement of grain boundaries is limited. As a result, crystal grains can be inhibited from being enlarged or coarsened even when the temperature sensor is used at high temperature over a long period of time. In addition, the strength of the electrode wire is enhanced due to the precipitation strengthening function achieved by the alkaline-earth metal being contained in the alloy, and the breaking elongation of the electrode wire is advantageously large due to the small grain size. Thus, a temperature sensor can be provided in which the high-temperature strength of the electrode wire is enhanced, and the occurrence of breakage or the like of the electrode wire is inhibited even when the temperature sensor is used at high temperature over a long period of time.

In the platinum-palladium-rhodium alloy forming the electrode wire, substantially all of the alkaline-earth metal is present in the form of second-phase precipitated grains, and substantially the entirety of the matrix phase portion is the Pt—Pd—Rh alloy. Therefore, the electrical conductivity, thermal conductivity, and the like of the electrode wire are equivalent to and are not degraded from the case where an electrode wire is formed from a conventional PtRh alloy.

Furthermore, according to the temperature sensor of the present invention, a portion of Pt included in the electrode wire is replaced with Pd, and the alkaline-earth metal is added. Therefore, the electrode wire maintains the oxidation resistance and high-melting point characteristics of Rh, has a higher strength than an electrode wire formed from PtRh alloy, and can be used at high temperature over a long period of time. In addition, Pd is contained in the electrode wire, and therefore, the amounts of Pt and Rh that are used can be relatively reduced. Accordingly, the electrode wire can be produced at lower cost, and a large increase in the selling price of the temperature sensor can be avoided.

In a preferred embodiment (2) of the temperature sensor (1) above, the electrical wire and the signal wire are joined together via a fused portion. In the platinum-palladium-rhodium alloy forming the electrode wire, the eutectic point between the second-phase precipitated grains and the matrix phase is lower than that of PtRh alloy as the matrix phase. Therefore, it is easy to join the electrode wire to the signal wire via a fused portion formed by welding. In addition, a homogeneous fused portion can be formed, and therefore, a temperature sensor having excellent joint strength between the electrode wire and the signal wire can be provided. As a welding technique for forming the fused portion, laser welding, electron beam welding, resistance welding, or the like can be used, for example.

In another preferred embodiment (3) of the temperature sensor (1) or (2) above, the signal wire is formed from an alloy containing, as a main component, one selected from the group consisting of Fe, Ni, Co and Cr. The term "main component" as used herein in this specification, is a component that occupies 50 mass % or more of a material. In this case, the heat resistance of the signal wire can be improved, and the signal wire can be formed from a material which costs less than an electrode wire which contains a high-cost noble metal. Therefore, a temperature sensor can be provided which has higher reliability and in which a large increase in the selling price thereof can be avoided.

In the present invention, the temperature sensing element may be configured such that a metal resistor having electrical characteristic which varies depending on temperature (e.g., a thin-film resistor made of Pt) is formed by patterning on an insulating ceramic substrate and is electrically connected to the electrode wire. Alternatively, the temperature sensing element may be configured such that a thermistor film layer having an electrical characteristic which varies depending on temperature is laminated on an insulating ceramic substrate and is electrically connected to the electrode wire. Alternatively, the temperature sensing element may be configured such that a molded body made of thermistor powder and having a predetermined shape is sintered with a portion of the electrode wire being buried therein, and therefore, the electrode wire is integrated with the thermistor sintered body.

DESCRIPTION OF REFERENCE NUMERALS

Figure 1:
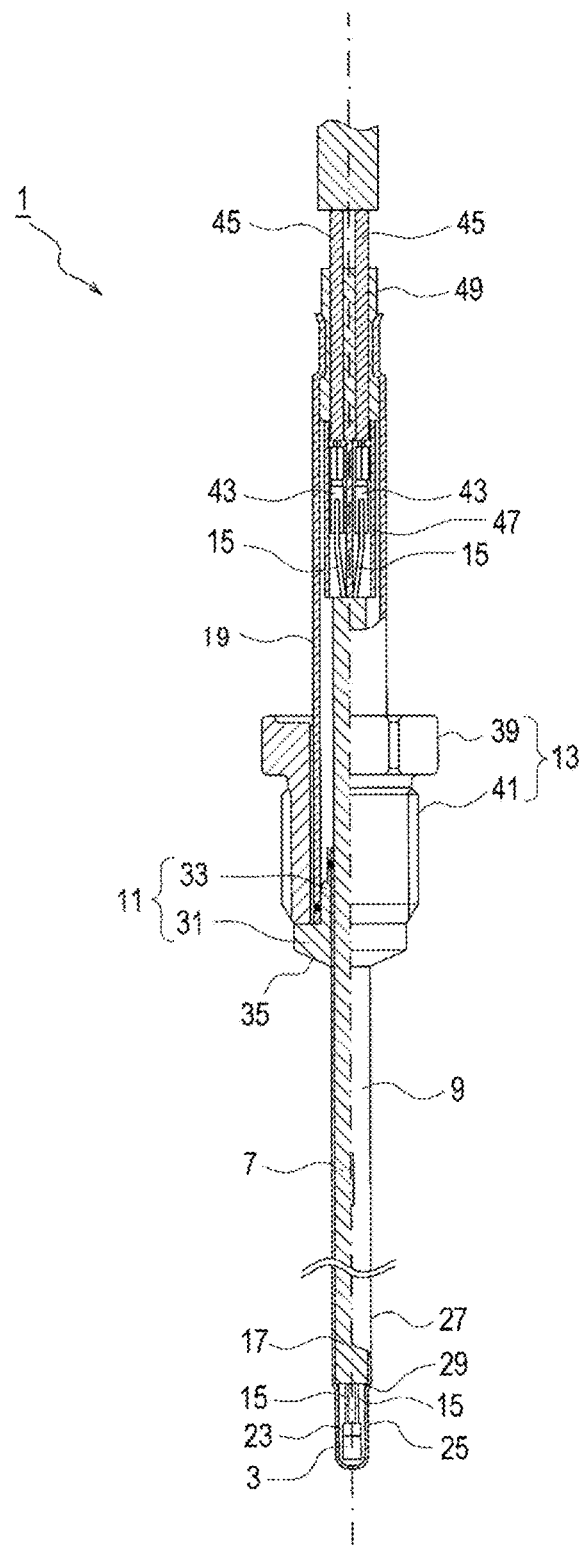
FIG. 1 is a partial cross-sectional view showing the overall structure of a temperature sensor according to Embodiment 1.

Reference numerals used to identify various features in the drawings include the following.
1 temperature sensor
3 temperature sensing element
4 temperature sensing portion
5 electrode wire
15 sheath core wire (signal wire)

DETAILED DESCRIPTION OF THE PREFERRED EMBODIMENTS

Embodiments of the present invention will next be described with reference to the drawings. However, the present invention should not be construed as being limited thereto.

Embodiment 1

Figure 2:
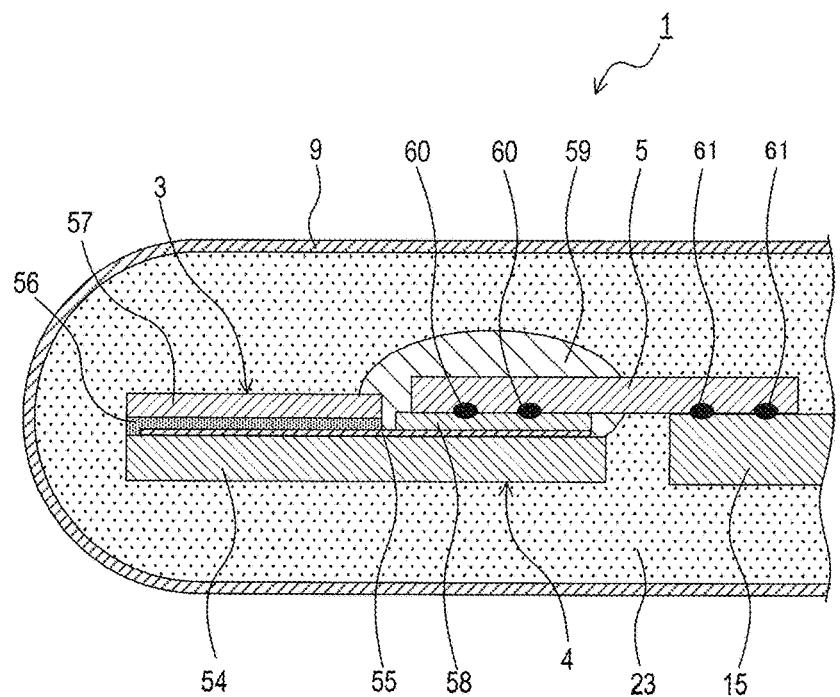
FIG. 2 is a cross-sectional view showing, in an enlarged manner, a front-side portion of the temperature sensor according to Embodiment 1.

As shown in FIGS. 1 and 2, a temperature sensor 1 includes: a temperature sensing element 3 including a temperature sensing portion 4 having an electrical characteristic which varies depending on temperature, and electrode wires 5 for outputting an electrical signal from the temperature sensing portion 4 to the sheath core wires (signal wires) 15 electrically connected to the electrode wires 5, and ultimately outside the temperature sensor 1 for connection to an external circuit via lead wires 45.

Each electrode wire 5 is formed from a platinum-palladium-rhodium alloy. The platinum-palladium-rhodium alloy contains a total of 0.1 to 1.2 mol % of at least one alkaline-earth metal selected from the group consisting of Ca, Sr and Ba, 0.1 to 43.0 mol % of Pd and 1.0 to 43.0 mol % of Rh, the remainder being Pt and incidental impurities. In the platinum-palladium-rhodium alloy, second-phase precipitated grains mainly containing Pt, Pd and the alkaline-earth metal are dispersed in a matrix phase. The temperature sensor 1 will now be described in detail.

As shown in FIG. 1, the temperature sensor 1 is mounted to a flow pipe such as an exhaust pipe for an internal combustion engine so as to be disposed in the flow pipe in which a gas to be measured (exhaust gas) flows, and thereby is used for detecting the temperature of the gas to be measured. The longitudinal direction of the temperature sensor 1 is an axial direction, and corresponds to the vertical direction in FIG. 1. In addition, the front side of the temperature sensor 1 is the lower side in FIG. 1, and the rear side of the temperature sensor 1 is the upper side in FIG. 1.

The temperature sensor 1 includes the temperature sensing element 3, a sheath member 7, a metal tube 9, a mounting member 11, a nut member 13, and a tubular member 19. The temperature sensing element 3 is disposed inside the metal tube 9 which, in turn, is disposed in the flow pipe in which a gas to be measured flows. The temperature sensing element 3 will be described in detail below.

The sheath member 7 includes: a metal sheath 17; a pair of sheath core wires 15 made of a conductive metal; and insulating powder (not shown) that electrically insulates the sheath 17 from the pair of sheath core wires 15 and holds the sheath core wires 15. That is, the sheath member 7 is configured to insulate and hold the pair of sheath core wires 15 from and inside the sheath 17.

The metal tube 9 is a tubular member having a bottom and formed by deep drawing of a steel plate with a front end portion thereof in the axial direction being closed. The axial dimension of the metal tube 9 is set such that a rear end portion thereof in the axial direction is in contact with the inner surface of the mounting member 11. The metal tube 9 is made of a corrosion-resistant metal (e.g., a stainless steel alloy such as SUS310S which is also a heat-resistant metal).

The metal tube 9 includes: a small-diameter portion 25 which is formed at the front end of the metal tube 9; a large-diameter portion 27 which is formed at the rear side of the small-diameter portion 25 and has an outer diameter larger than that of the small-diameter portion 25; and a step portion 29 formed between the small-diameter portion 25 and the large-diameter portion 27. The outer diameter of the step portion 29 gradually increases from the small-diameter portion 25 toward the large-diameter portion 27.

The temperature sensing element 3 and a cement (holding member) 23 are disposed inside the metal tube 9. The cement 23 fills a space around the temperature sensing element 3, and holds the temperature sensing element 3 to inhibit vibration of the temperature sensing element 3. The cement 23 is formed of a material having a high thermal conductivity, high heat-resistance, and high insulating properties.

An example of the cement 23 which may be used is one which mainly contains an oxide such as $Al_2O_3$ or MgO, a nitride such as AlN, TiN, $Si_3N_4$ or BN, a carbide such as SiC, TiC or ZrC, etc. An alternative example of the cement 23 which may be used is one which mainly contains an oxide such as $Al_2O_3$ or MgO, a nitride such as AlN, TiN, $Si_3N_4$ or BN, a carbide such as SiC, TiC or ZrC, etc., and is mixed with an inorganic binder such as $Al_2O_3$, $SiO_2$ or MgO and an oxygen supplying material such as Ce.

The mounting member 11 surrounds a rear-side outer peripheral surface of the metal tube 9 with at least the front end of the metal tube 9 being exposed to the outside, and supports the metal tube 9. The mounting member 11 includes a projecting portion 31 which projects outward in the radial direction, and a sheath portion 33 which is located at the rear side of the projecting portion 31 and extends in the axial direction.

The projecting portion 31 is provided with a mounting seat surface 35 at the front side thereof. The mounting seat surface 35 is formed in a tapered shape having an outer diameter which becomes smaller toward the front side. The mounting seat surface 35 corresponds to a sensor mounting position (not shown) of the exhaust pipe. At the sensor mounting position, which is a site where the exhaust pipe is brought into contact with the mounting seat surface 35, the exhaust pipe is formed to have a tapered portion having an outer diameter which becomes larger toward the rear side.

Since the mounting member 11 is disposed at the sensor mounting position of the exhaust pipe, the mounting seat surface 35 comes into close contact with the tapered portion at the sensor mounting position, and thereby inhibits leakage of exhaust gas from the exhaust pipe to the outside. After the mounting member 11 is pressed into the rear end portion of the metal tube 9, the sheath portion 33 of the mounting member 11 is laser-welded to the metal tube 9, so that the mounting member 11 and the metal tube 9 are fixed to each other.

The nut member 13 is a tubular member having a hexagonal nut portion 39 and a threaded portion 41. The nut member 13 is rotatably disposed on the outer periphery of the mounting member 11 with the front end surface of the threaded portion 41 being in contact with the rear end surface of the projecting portion 31. The threaded portion 41 of the nut member 13 is brought into engagement with a threaded hole provided in the exhaust pipe, so that the temperature sensor 1 is mounted to the exhaust pipe at the sensor mounting position.

Each sheath core wire 15 has a front end portion electrically connected to the temperature sensing element 3. Each sheath core wire 15 has a rear end portion connected to a crimped terminal 43 by means of resistance welding. That is, the rear end of each sheath core wire 15 is connected to a lead wire 45 for connection to an external circuit (e.g., an electronic control unit (ECU) of a vehicle) through the crimped terminal 43.

The rear end portions of the pair of sheath core wires 15 are insulated from each other by an insulating tube 47, and the pair of crimped terminals 43 are also insulated from each other by the insulating tube 47. The lead wire 45 is a conductive wire coated with an insulating coating material. The lead wire 45 is disposed to penetrate through the inside of a seal member 49 made of a heat-resistant rubber. The seal member 49 is inserted into the rear end portion of the tubular member 19 laser-welded to the front side of the sheath portion 33 of the mounting portion 11, and a rear-side outer surface of the tubular member 19 is shrunk inward in the radial direction, so that the inside of the tubular member 19 is reliably sealed.

As shown in FIG. 2, the temperature sensing element 3 includes: the temperature sensing portion 4 having an electrical characteristic which varies depending on temperature; and a pair of electrode wires 5 connected to the temperature sensing portion 4. The temperature sensing portion 4 includes a ceramic base 54, a metal resistor 55, a bonding layer 56, a ceramic coating layer 57 and an electrode pad 58.

The ceramic base 54 is a sintered sheet which is made of alumina having a purity of 99.5 to 99.9% and is formed by sintering a ceramic green sheet in advance. The metal resistor 55 is a temperature measuring resistor mainly containing platinum (Pt) and having an electrical characteristic (electrical resistance value) which varies depending on temperature. The metal resistor 55 is formed in a predetermined pattern on the surface of the ceramic base 54.

The ceramic coating layer 57 is a sintered sheet which is made of alumina having a purity of 99.5 to 99.9% and is formed by sintering a ceramic green sheet in advance. The ceramic coating layer 57 coats a front end portion of the opposite surface of the metal resistor 55 from the ceramic base 54.

The bonding layer 56 is made of alumina having a purity of 99.5 to 99.9%. The bonding layer 56 is, before bonding, a paste containing alumina powder. The ceramic base 54 and the ceramic coating layer 57, which have been sintered, are bonded to each other using the paste, and then the paste is heat-treated to finally form the bonding layer 56.

The pair of electrode wires 5 are electrically connected to the rear side (the right side in FIG. 2) of the metal resistor 55 through an electrode pad 58 formed to be wider than the conductive pattern coated with the ceramic coating layer 57. The electrode pad 58 and the pair of electrode wires 5 are joined together at fused portions 60 by welding such as resistance welding or laser welding.

The joint portion between the electrode pad 58 and the pair of electrode wires 5 is coated with a coating member 59. The coating member 59 is formed from a glass material containing aluminosilicate glass as a main component. This glass material may contain a ceramic material (alumina or the like) as a minor component.

The pair of electrode wires 5 are disposed so as to extend from the rear side of the metal resistor 55 toward the sheath member 7. Rear end portions of the pair of electrode wires 5 overlap with front end portions of the pair of sheath core wires 15. The rear end portions of the pair of electrode wires 5 and the front end portions of the pair of sheath core wires 15 are joined together by welded portions 61 formed by laser welding. A cross-sectional area of each electrode wire 5 is set to be smaller than a cross-sectional area of each sheath core wire 15. The cross-sectional areas of each electrode wire 5 and each sheath core wire 15 are the areas of cross sections thereof orthogonal to the axial direction.

In this embodiment, each electrode wire 5 is formed from the platinum-palladium-rhodium alloy containing the above components. When the content of the alkaline-earth metal is smaller than 0.1 mol %, precipitation of the second phase is insufficient, and therefore, excessive grain growth is unlikely to be inhibited. When the content of the alkaline-earth metal is greater than 1.2 mol %, the second phase excessively precipitates, and therefore, the oxidation resistance and toughness of the electrode wire are likely to be reduced.

The extent to which the electrode wire is occupied by the dispersed second phase, i.e., the percentage of the area of the second phase observed in a cross-section of the electrode wire taken along the direction in which the electrode wire itself extends, is preferably 10% or less. When the percentage of the area of the second phase exceeds 10%, precipitation is excessive, and therefore, the oxidation resistance and toughness of the electrode wire are reduced, and the electrode wire is likely to break during working. The percentage of the area of the second phase refers to the percentage of the area of the second phase which can be visually recognized in the infinite area of the field of view for observation in a case where the electrode wire is cut along the direction in which the electrode wire itself extends, the cut surface is polished into a mirror surface, and the mirror surface is observed using an optical microscope, an SEM, or other observation means.

In the temperature sensor 1 of this embodiment, the amount of Rh contained in each electrode wire 5 is preferably 43.0 mol % or less. When the Rh content exceeds 43.0 mol %, it is difficult to work the electrode wire 5. Meanwhile, the Rh content is preferably 1.0 mol % or more. When the Rh content is smaller than 1.0 mol %, the high-temperature strength of the electrode wire may not be attained. In order to attain both good high-temperature strength and good workability of the electrode wire, the Rh content is more preferably 5.0 to 28.0 mol %.

The amount of Pd contained in each electrode wire 5 is preferably 43.0 mol %. When the Pd content exceeds 43.0 mol %, a defect is likely to occur due to gas occlusion. Meanwhile, the Pd content is preferably 0.1 mol % or more. When the Pd content is smaller than 0.1 mol %, it is difficult to attain the effect of relatively reducing the amounts of Pt and Rh that are used, and therefore, it is difficult to produce the electrode wire at low cost. The Pd content is more preferably 1.0 to 28.0 mol %. In order to stably increase the strength of the electrode wire and stably obtain the electrode wire capable of being used at high temperature over a long period of time, the total amount of Pd and Rh preferably satisfies 6.0 mol %≤Pd+Rh≤56.0 mol %. Only one of Ca, Sr and Ba may be used as the alkaline-earth metal contained in the platinum-palladium-rhodium alloy. Alternatively, two or more of these alkaline-earth metals such as two metals Ca and Sr or two metals Sr and Ba may be contained in the platinum-palladium-rhodium alloy. Alternatively, all of the three metals may be contained in the platinum-palladium-rhodium alloy.

Meanwhile, each sheath core wire 15 connected to the electrode wire 5 may be formed of a material different from that of the electrode wire 5. Specifically, each sheath core wire 15 is formed from an alloy containing, as a main component, one of Fe, Ni, Co and Cr. As an example Fe alloy, SUS310S or the like can be used. As an example Ni alloy, NCF600, NCF601, or the like can be used. In this embodiment, SUS310S is used as a material for the sheath core wire 15.

Next, the advantages of the temperature sensor 1 of this embodiment will be described.

In the temperature sensor 1 of this embodiment, since second-phase precipitated grains are present in the platinum-palladium-rhodium alloy forming each electrode wire 5, the movement of grain boundaries is limited, and therefore, crystal grains can be inhibited from being enlarged or coarsened even when the temperature sensor is used at high temperature over a long period of time. In addition, the strength of the electrode wire 5 is enhanced due to the precipitation strengthening function, and the breaking elongation of the electrode wire 5 is advantageously large due to the small grain size. Thus, the high-temperature strength of the electrode wire 5 can be enhanced, resulting in an increase in durability and reliability. In addition, the occurrence of breakage or the like of the electrode wire 5 can be inhibited even when the temperature sensor 1 is used at high temperature over a long period of time.

Further, in the platinum-palladium-rhodium alloy forming each electrode wire 5, substantially all of the alkaline-earth metal is present in the form of second-phase precipitated grains, and the matrix phase portion is the Pt—Pd—Rh alloy. Therefore, the electrical conductivity, thermal conductivity, and the like of the electrode wire 5 are equivalent to and are not degraded from those in the case where an electrode wire is formed from a conventional PtRh alloy. In addition, in the platinum-palladium-rhodium alloy, the eutectic point between the second-phase precipitated grains and the matrix phase is lower than that of PtRh alloy as the matrix phase. Therefore, it is easy to join (weld) the electrode wire 5 to the sheath core wire 15 via the fused portions 61.

Further, in the temperature sensor 1 according to the present embodiment, each sheath core wire (signal wire) 15 is formed from a material different from that of each electrode wire 5. Therefore, the cost of the temperature sensor 1 can be reduced by selecting, as a material for each sheath core wire 15, a material which costs less than each electrode wire 5 which contains the high-cost noble metal.

Each sheath core wire (signal wire) 15 is formed from an alloy containing, as a main component, one of Fe, Ni, Co and Cr. In this case, the heat resistance of the sheath core wire 15 can be improved. Thus, the durability and reliability of the sheath core wire 15 can be enhanced.

Thus, according to this embodiment, the temperature sensor 1 can be provided in which a platinum-palladium-rhodium alloy which does not form large and coarse crystal grains even when the temperature sensor 1 is used at high temperature over a long time is used for each electrode wire 5, so that the high-temperature strength of each electrode wire 5 is enhanced.

Embodiment 2

Figure 3:
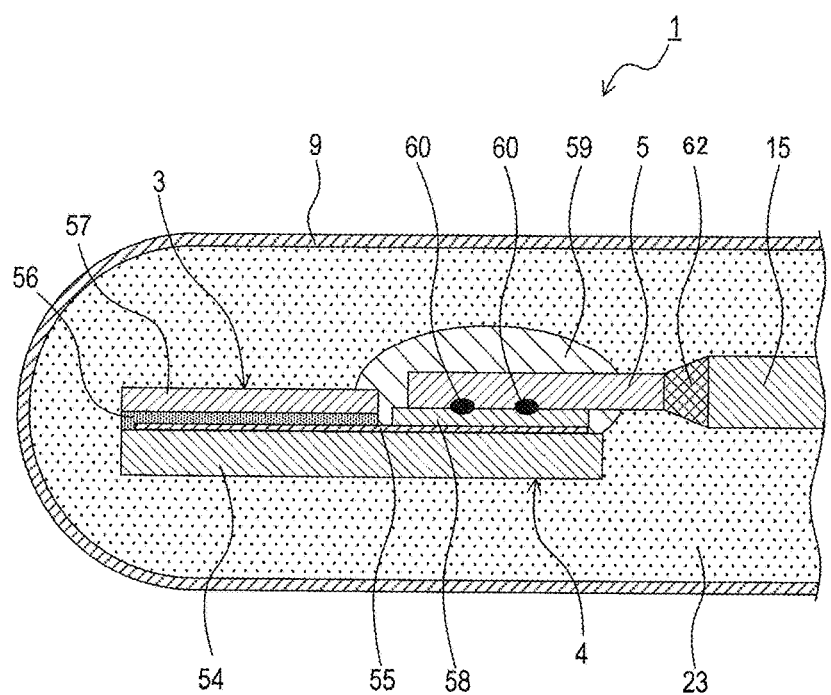
FIG. 3 is a cross-sectional view showing, in an enlarged manner, a front-side portion of a temperature sensor according to Embodiment 2.

As shown in FIG. 3, this embodiment is an example in which the configuration of the fused portion (welded portion) between each electrode wire 5 and each sheath core wire 15 in the temperature sensor 1 is changed. Configurations and advantages that are the same as those of Embodiment 1 will not be described.

As shown in FIG. 3, the rear ends of a pair of electrode wires 5 are caused to butt the front ends of a pair of sheath core wires 15 extending from the front end of a sheath member 7 (see FIG. 1), and in this situation, are joined together. That is, the rear ends of the pair of electrode wires 5 and the front ends of the pair of sheath core wires 15 are joined together at fused portions 62 by laser welding.

size which was measured by quadrature specified in JIS H 0501 (methods for estimating average grain size of wrought copper and copper alloys) after the cross-section of the alloy was etched. The tensile strength was measured using a tensile testing machine.

Table 1 shows the alloy compositions and test results of the examples and comparative example. In Table 1, "AE" represents an "alkaline-earth metal." FIG. 5 is a diagram in which the horizontal axis represents the amounts of Rh added to the alloys (Rh concentrations) of the examples and comparative example, and the vertical axis represents the tensile strength.

Figure 6:
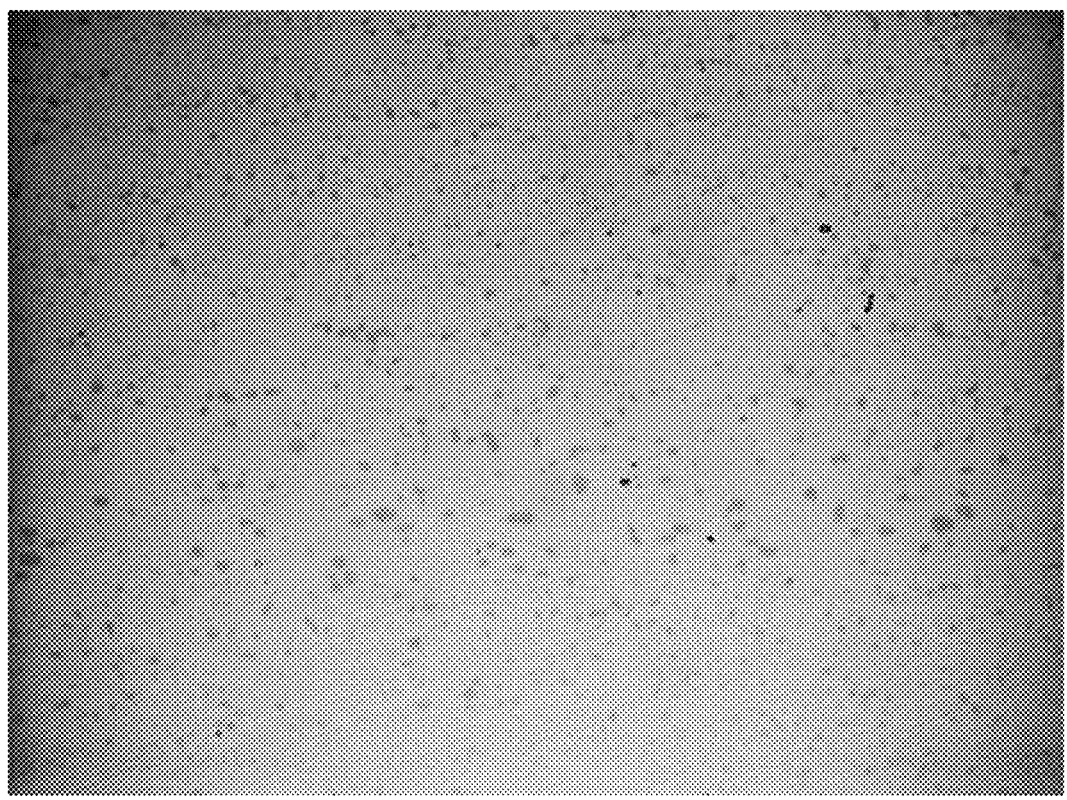
FIG. 6 is a cross-sectional view of the alloy of Example 4.

FIG. 6 shows a cross-section of an alloy of Example 4. The examples and comparative example were analyzed using an EPMA. As a result, precipitated second phases were identified as intermetallic compounds mainly containing Pt, Pd and an alkaline-earth metal.

As seen from Table 1, the alloys of the examples have a percentage of the area of the second phase of 10% or less, and maintain a fine grain size of 100 μm or less even after having been annealed at high temperature. The results of the examples also show that the percentage of the area of the second phase tends to increase with an increase in the content of the alkaline-earth metal.

Figure 5:
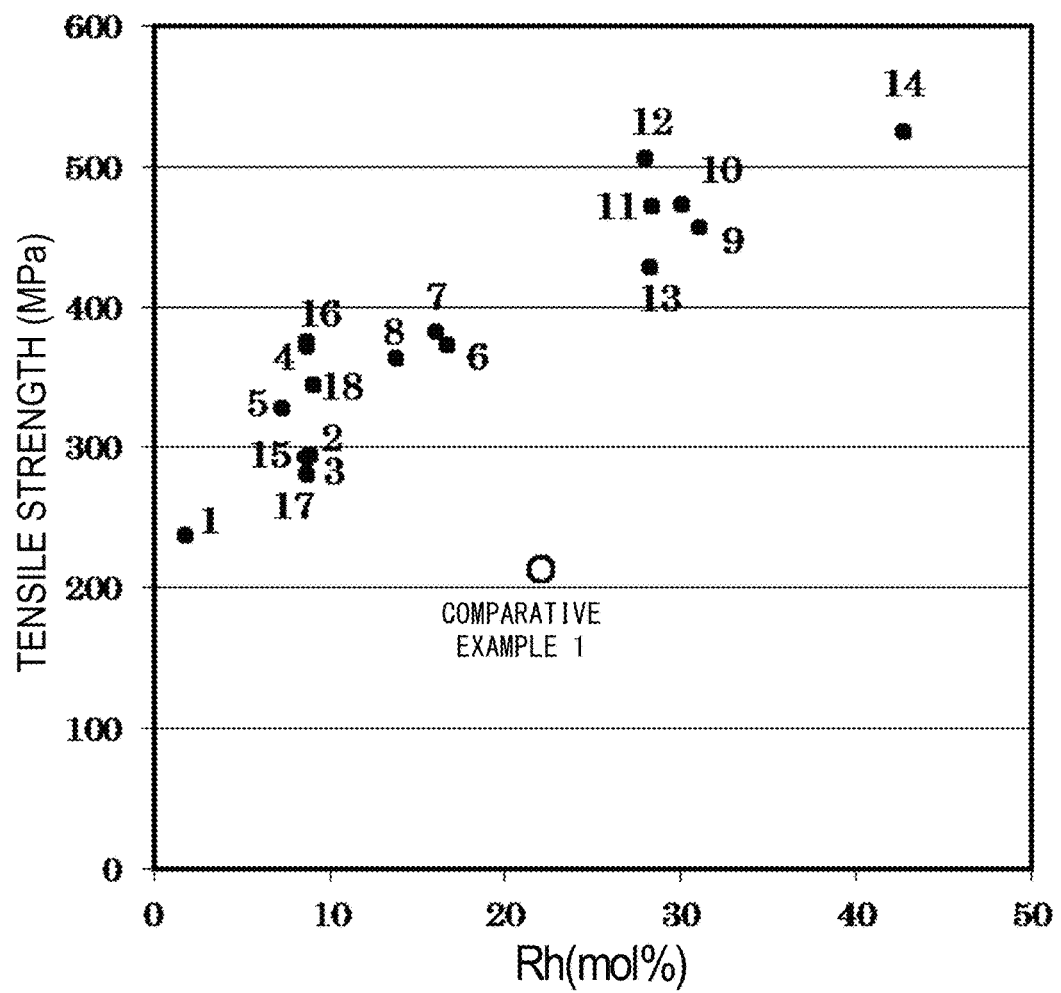
FIG. 5 is a plot of a portion of examples and a comparative example, wherein the vertical axis represents the amount of Rh added (unit: mol %) and the horizontal axis represents tensile strength (unit: MPa).

As seen from FIG. 5, the alloys (platinum-palladium-rhodium alloys) of the examples have a greater tensile strength than that of a PtRh alloy having the same concentration of added Rh, and have enhanced strength.

TABLE 1

| No. | Pd mol % | Rh mol % | AE mol % | Pt | Percentage of area % | Grain size mm | Tensile strength MPa |
|---|---|---|---|---|---|---|---|
| Example 1 | 8.7 | 1.9 | 0.3Sr | remainder | 1.7 | 15 | 237 |
| Example 2 | 1.6 | 8.9 | 0.3Sr | remainder | 1.9 | 26 | 294 |
| Example 3 | 8.5 | 8.8 | 0.3Sr | remainder | 1.0 | 33 | 291 |
| Example 4 | 8.5 | 8.7 | 0.9Sr | remainder | 3.0 | 11 | 371 |
| Example 5 | 42.3 | 7.3 | 0.2Sr | remainder | 0.8 | 50 | 328 |
| Example 6 | 8.1 | 16.8 | 0.2Sr | remainder | 1.9 | 21 | 372 |
| Example 7 | 15.6 | 16.0 | 0.2Sr | remainder | 1.4 | 28 | 382 |
| Example 8 | 30.6 | 13.9 | 0.5Sr | remainder | 2.5 | 20 | 363 |
| Example 9 | 7.5 | 31.1 | 0.2Sr | remainder | 1.3 | 29 | 456 |
| Example 10 | 14.5 | 30.0 | 0.2Sr | remainder | 2.0 | 37 | 472 |
| Example 11 | 27.0 | 28.4 | 0.1Sr | remainder | 0.4 | 27 | 471 |
| Example 12 | 27.1 | 28.0 | 0.2Sr | remainder | 1.0 | 16 | 506 |
| Example 13 | 26.8 | 28.3 | 0.5Sr | remainder | 3.1 | 28 | 428 |
| Example 14 | 6.9 | 42.7 | 0.2Sr | remainder | 1.3 | 22 | 524 |
| Example 15 | 8.3 | 8.4 | 0.2Ba | remainder | 1.4 | 25 | 294 |
| Example 16 | 8.4 | 8.7 | 0.9Ba | remainder | 6.3 | 10 | 374 |
| Example 17 | 8.5 | 8.7 | 0.3Ca | remainder | 1.3 | 59 | 280 |
| Example 18 | 8.5 | 9.1 | 1.2Ca | remainder | 6.8 | 13 | 344 |
| Comparative Example 1 | 0 | 22.1 | 0 | remainder | — | 122 | 213 |

(Test Evaluation)

A material for the electrode wire included in the temperature sensor of the present invention will now be described by comparing examples with a comparative example. Initially, predetermined amounts of materials, i.e., the alkaline-earth metal, Pt, Pd and Rh, were mixed together. The entire mixture was melted by an arc. The resulting ingot was annealed at 1000° C. for 1 h, and worked by a known wire drawing technique into a diameter of 0.29 mm.

The wire material having a diameter of 0.29 mm was annealed at 1400° C. for 1 h. The resulting wire material was used as a test specimen. The test specimen was used in the following measurement. A percentage of area is the percentage of the area of the second phase measured by observing a cross-section where the test specimen was cut along the direction in which the test specimen extends, and the cut surface was polished. Grain size is an average crystal grain Next, the alloys of the above examples and comparative example were applied to electrode wires, and temperature sensors employing the electrode wires were evaluated. Initially, a plurality of temperature sensing elements having the configuration of Embodiment 1 were produced using wire materials having a diameter of 0.29 which have the compositions of the alloys of Example 2, Example 4, Example 7, Example 13 and Comparative Example 1 described above. Thereafter, the temperature sensing elements were each connected to a sheath portion, and put together with a metal tube, a mounting member, and the like to assemble and prepare a plurality of temperature sensors having the configuration of Embodiment 1. The electrode wire having a diameter of 0.29 and a length of 3.0 mm was overlapped and joined with an electrode pad over a front end portion having a length of 1.3 mm of the electrode wire. The electrode wire was also overlapped and joined with a front end portion of a sheath core wire having a diameter of 0.5 mm over a rear end portion having a length of 0.8 mm of the electrode wire by laser welding. Thus, the temperature sensors were prepared. Thereafter, each temperature sensor was subjected to a cycle test in which temperature is alternately and repeatedly increased and decreased between room temperature and a maximum temperature, followed by evaluation of robustness.

The cycle test was performed under the following conditions: the maximum temperature was 800° C.; the maximum temperature holding time was 60 sec; the temperature increase time was 30 sec; and the temperature decrease time was 30 sec. When the temperature was decreased to reach room temperature, the temperature was not held at room temperature but was immediately increased. The robustness was evaluated by checking the presence or absence of breakage of each electrode wire after 5,000 cycles.

As a result, breakage of the electrode wire was observed in the temperature sensor of Comparative Example 1, which was therefore assessed as having poor robustness. Breakage of the electrode wire was not found in any of the temperature sensors of Examples 2, 4, 7 and 13, which were therefore assessed as having good robustness. As a result, it was demonstrated that, in the temperature sensor including the electrode wire formed from the platinum-palladium-rhodium alloy of the present invention, breakage of the electrode wire can be inhibited even when the temperature sensor is used at high temperature over a long period of time. Even in temperature sensors including electrode wires of alloys of examples other than Examples 2, 4, 7 and 13, good tensile strength was obtained as in Examples 2, 4, 7 and 13, and therefore, breakage of the electrode wire can be inhibited.

Other Embodiments

The present invention is by no means limited to the above embodiments, and needless to say, can be carried out in various modes without deviating from the scope of the invention.

(1) For example, in the above embodiments, a Fe alloy and a Ni alloy are described as examples of the alloy forming each sheath core wire (signal wire) 15. However, the material for the each sheath core wire (signal wire) 15 is not limited thereto. For example, a Co alloy, a Cr alloy, and the like may be used. Specifically, UMCo-50 (manufactured by Hitachi Metals MMC Superalloy, Ltd.) may be used as an example of the Co alloy, and Kurimax (manufactured by Kurimoto, Ltd.) may be used as an example of the Cr alloy.

(2) As another example, in the above embodiments, the temperature sensing portion 4 is formed by using the metal resistor 55 having an electrical characteristic which varies depending on temperature. Alternatively, the temperature sensing portion 4 may be formed by using, for example, a thermistor sintered body having an electrical characteristic which varies depending on temperature. As an example of the thermistor sintered body, a perovskite oxide having a base composition, $(Sr, Y)(Al, Mn, Fe)O_3$, may be used.

Figure 4:
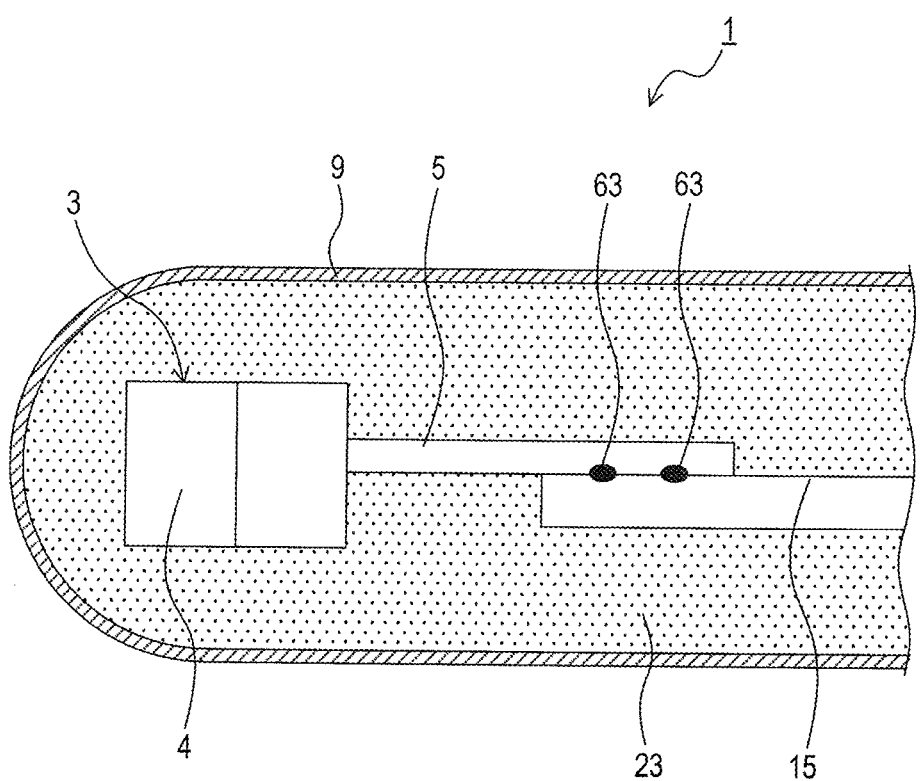
FIG. 4 is a cross-sectional view showing, in an enlarged manner, a front-side portion of a temperature sensor according to another embodiment.

FIG. 4 shows a temperature sensor 1 including a temperature sensing element 3 which includes: a temperature sensing portion 4 composed of such a thermistor sintered body; and a pair of electrode wires 5 connected to the temperature sensing portion 4. Rear end portions of the pair of electrode wires 5 overlap with front end portions of a pair of sheath core wires 15 extending from the front end of a sheath member 7 (see FIG. 1). The pair of electrode wires 5 and the pair of sheath core wires 15 are joined together at fused portions 63 by welding such as resistance welding or laser welding. The pair of electrode wires 5 are buried in the thermistor sintered body (temperature sensing element 4) having a portion having a hexagonal shape as seen in plan view. Also in the above structure, advantages that are the same as those of Embodiments 1 and 2 can be achieved by forming each electrode wire 5 from the above platinum-palladium-rhodium alloy.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2016-029419 filed Feb. 19, 2016, the content of which is incorporated herein by reference in its entirety.

What is claimed is:

1. A temperature sensor comprising:
a temperature sensing element including a temperature sensing portion having an electrical characteristic which varies depending on temperature, and an electrode wire for outputting an electrical signal from the temperature sensing portion; and
a signal wire electrically connected to the electrode wire, wherein
the electrode wire is formed from a platinum-palladium-rhodium alloy containing Pt, Pd and Rh, and
the platinum-palladium-rhodium alloy contains a total of 0.1 to 1.2 mol % of at least one alkaline-earth metal selected from the group consisting of Ca, Sr and Ba, 1.0 to 28.0 mol % of Pd, and 1.0 to 43.0 mol % of Rh, the remainder being Pt and incidental impurities, and in the platinum-palladium-rhodium alloy, second-phase precipitated grains containing the Pt, the Pd and the alkaline-earth metal are dispersed in a matrix phase,
wherein the total amount of Pd and Rh in the platinum-palladium-rhodium alloy satisfies 6.0 mol %$\leq$Pd+Rh$\leq$56.0 mol %.

2. The temperature sensor as claimed in claim 1, wherein the electrical wire and the signal wire are joined together via a fused portion.

3. The temperature sensor as claimed in claim 1, wherein the signal wire is formed from an alloy containing, as a main component, one selected from the group consisting of Fe, Ni, Co and Cr.

4. A temperature sensor comprising:
a temperature sensing element including a temperature sensing portion having an electrical characteristic which varies depending on temperature, and an electrode wire for outputting an electrical signal from the temperature sensing portion; and
a signal wire electrically connected to the electrode wire, wherein
the electrode wire is formed from a platinum-palladium-rhodium alloy containing Pt, Pd and Rh, and
the platinum-palladium-rhodium alloy contains a total of 0.1 to 1.2 mol % of at least one alkaline-earth metal selected from the group consisting of Ca, Sr and Ba, 0.1 to 43.0 mol % of Pd, and 1.0 to 43.0 mol % of Rh, the remainder being Pt and incidental impurities, and in the platinum-palladium-rhodium alloy, second-phase precipitated grains containing the Pt, the Pd and the alkaline-earth metal are dispersed in a matrix phase, wherein the total amount of Pd and Rh in the platinum-palladium-rhodium alloy satisfies 6.0 mol %≤Pd+Rh≤56.0 mol %, and wherein the Pd content of the platinum-palladium-rhodium alloy is larger than that of the Rh content.

* * * * *